(12) United States Patent
Hotta

(10) Patent No.: US 8,488,229 B2
(45) Date of Patent: Jul. 16, 2013

(54) METHOD FOR CALIBRATION OF OPTICALLY VARIABLE FILTER ARRAY APPARATUS

(75) Inventor: Yuji Hotta, Aichi (JP)

(73) Assignee: Santec Corporation, Komaki (JP)

( * ) Notice: Subject to any disclaimer, the term of this patent is extended or adjusted under 35 U.S.C. 154(b) by 165 days.

(21) Appl. No.: 13/019,650

(22) Filed: Feb. 2, 2011

(65) Prior Publication Data
US 2012/0154893 A1 Jun. 21, 2012

(30) Foreign Application Priority Data
Dec. 15, 2010 (JP) ................................. 2010-279534

(51) Int. Cl.
*G02F 1/23* (2006.01)
(52) U.S. Cl.
USPC ........................................................ 359/278
(58) Field of Classification Search
USPC ................ 359/278, 290–292; 398/48, 49, 79, 398/85
See application file for complete search history.

(56) References Cited

U.S. PATENT DOCUMENTS

| 6,449,410 | B1 | 9/2002 | Que | |
|---|---|---|---|---|
| 7,304,798 | B2 * | 12/2007 | Izumi et al. | 359/577 |
| 2002/0176149 | A1 * | 11/2002 | Davis et al. | 359/290 |
| 2009/0263142 | A1 | 10/2009 | Shen et al. | |

FOREIGN PATENT DOCUMENTS

| JP | 5-196910 A | 8/1993 |
|---|---|---|
| JP | 11-23891 A | 1/1999 |
| JP | 2000-28931 A | 1/2000 |

OTHER PUBLICATIONS

J. Berger, et al., TuN2, Widely Tunable, Narrow Optical Bandpass Gaussian Filter Using a Silicon Microactuator, vol. 1, OFC 2003, Tuesday Afternoon, Mar. 25, 2003, pp. 252-253.

* cited by examiner

*Primary Examiner* — Tuyen Tra
(74) *Attorney, Agent, or Firm* — McGlew and Tuttle, P.C.

(57) ABSTRACT

In a wavelength selection element employed in an optically variable filter array apparatus, pixels in a line form are placed into a light reflection state so that wavelength-scanned light can be incident on the optically variable filter array apparatus. On the basis of the wavelength of scanned reflection light and the location of the pixel in a light reflection state at a timing of acquisition of output, the relationship between the x coordinate of the wavelength selection element and wavelength is determined. This makes it possible to achieve calibration of the optically variable filter array apparatus capable of selection of a desired wavelength with respect to a desired channel from multi-channel WDM light.

11 Claims, 14 Drawing Sheets

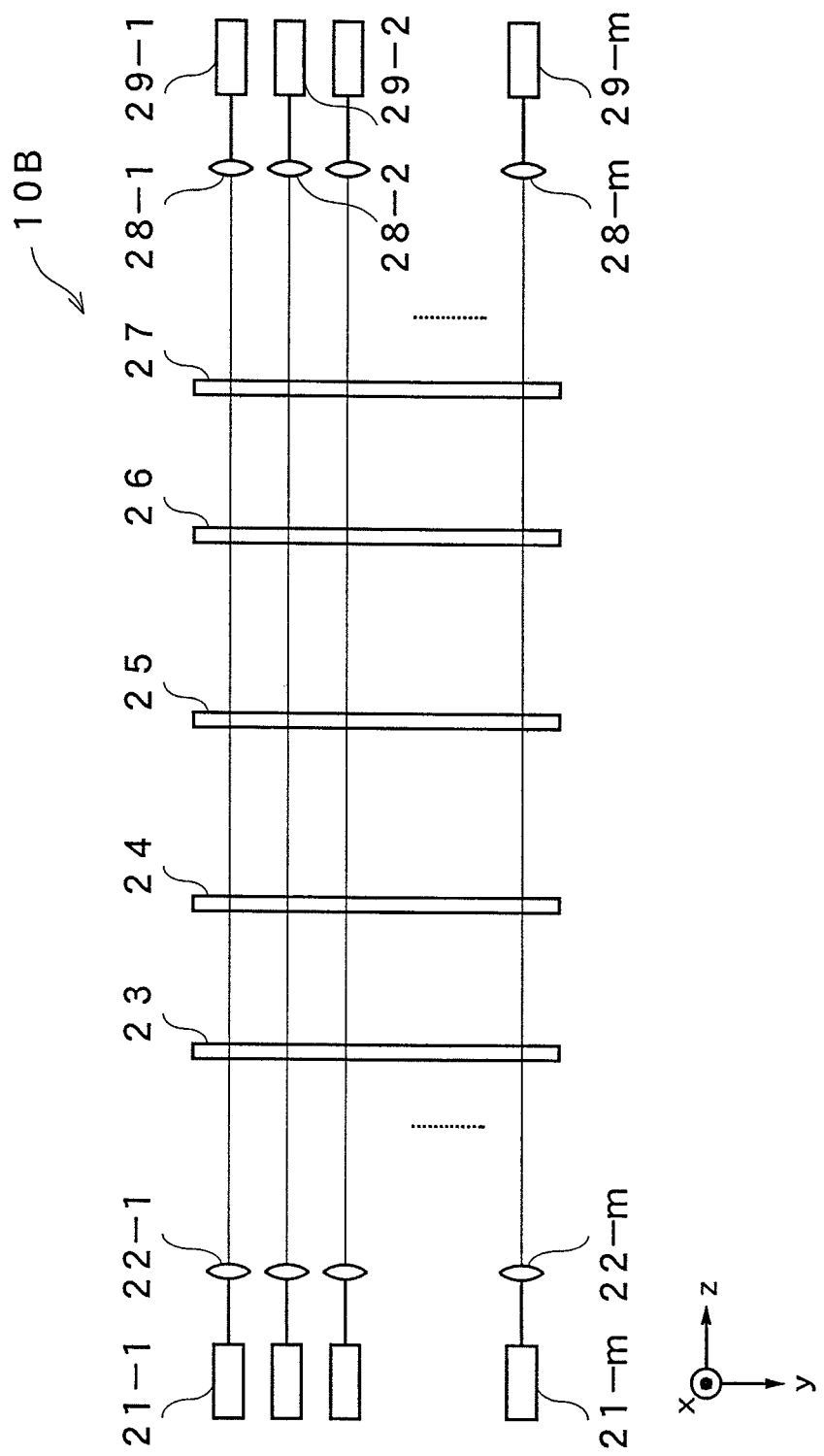

METHOD FOR CALIBRATION OF OPTICALLY VARIABLE FILTER ARRAY APPARATUS

BACKGROUND OF THE INVENTION

1. Field of the Invention

The present invention relates to a method for calibration of an optically variable filter array apparatus suitable for use in selection of WDM signals.

2. Discussion of the Related Art

At present ROADM (Reconfigurable Optical Add Drop-multiplexing) nodes for WDM communication systems are required to offer a sophisticated colorless Add-Drop function, or equivalently the capability of effecting separation and addition of optical signals with given frequencies. As a method for the attainment of the colorless function, there is known a configuration using a tunable filter array (TFA) for selecting a plurality of input signals from among input WDM signals. In Japanese Unexamined Patent Publication JP-A 11-23891 (1999) and Japanese Unexamined Patent Publication JP-A 5-196910 (1993) as well, there is proposed, as a tunable filter array structure of conventional design, an optically variable filter that utilizes variation in cavity length resulting from an electrical-field effect in a liquid crystal element. Moreover, in Japanese Unexamined Patent Publication JP-A 2000-28931 and U.S. Pat. No. 6,449,410 as well, there is proposed a wavelength variable filter for changing selected wavelengths with variation in cavity length resulting from mechanical alteration in MEMS.

Since a WDM modulated signal exhibits a spread of spectral components on a frequency axis, as a filter configuration, a flat-top spectral waveform pattern is desirable that is characterized by inclusion of signal spectral components and low crosstalk between adjacent channels. However, the filter configuration of a Fabry-Perot interferometer is of Lorentzian type, which is unsuitable for a filter for selecting specific wavelengths of WDM signals because of too narrow a peak range of a selected wavelength. Furthermore, in the filter disclosed in US 2009/0263141A1, power consumption is increased for array configuration due to the exploitation of TO effects. In addition, in the filter presented in Conference paper TuN2 of OFC 2003 by J. Berger, F. Ilkov, D. King, A. Tselikov, and D. Anthon, the filter configuration is of Gaussian-waveform pattern and is therefore, just like others of the conventional art, unsuitable for a filter for WDM signals.

SUMMARY OF THE INVENTION

In order to overcome the problems associated with conventional art as mentioned supra, an assignee of the present application has been assigned an application on an optically variable filter array apparatus. In the filter array apparatus, WDM signals corresponding to a plurality of channels as input signals are developed on a two-dimensional wavelength selection element for selection of a desired wavelength with respect to a given channel. Accordingly an object of the present invention is to provide a calibration method for an optically variable filter array apparatus by which the characteristics of an optically variable filter array apparatus are calibrated.

To solve the problems, a method for calibration of an optically variable filter array apparatus of the present invention having a wavelength selection element including a multiplicity of pixels two-dimensionally arranged in a lattice pattern on an xy plane as a light-receiving surface, for effecting filtering by allowing incidence of at least a single wavelength-dispersion light beam which is dispersed according to wavelength on said wavelength selection element, with an x-axis direction defined as a wavelength dispersion direction, and then varying light passage characteristics by controlling a voltage to be applied to each of the pixels, comprises the steps of: inputting wavelength-scanned light of single spectrum into said optically variable filter array apparatus to detect a correlation between an x coordinate of said wavelength selection element and a wavelength of incident light, and putting resultant data in storage; and inputting wavelength-scanned light of single spectrum into said optically variable filter array apparatus and varying a voltage to be applied to each of the pixels of said wavelength selection element to measure a relationship between an applied voltage and an insertion loss for each of wavelengths of light which is incident on and exits from said wavelength selection element, and putting resultant data in storage.

To solve the problems, a method for calibration of an optically variable filter array apparatus of the present invention having a wavelength selection element including a multiplicity of pixels two-dimensionally arranged in a lattice pattern on an xy plane as a light-receiving surface, for effecting filtering by allowing incidence of at least a single wavelength-dispersion light beam which is dispersed according to wavelength on said wavelength selection element, with an x-axis direction defined as a wavelength dispersion direction, and then varying light passage characteristics by controlling a voltage to be applied to each of the pixels, comprises the steps of: inputting wavelength-scanned light of single spectrum into said optically variable filter array apparatus to detect a correlation between an x coordinate of said wavelength selection element and a wavelength of incident light, and putting resultant data in storage; inputting wavelength-scanned light of single spectrum into said optically variable filter array apparatus to detect a correlation between a y coordinate of said wavelength selection element and a wavelength of incident light, and putting resultant data in storage; and inputting wavelength-scanned light of single spectrum into said optically variable filter array apparatus and varying a voltage to be applied to each of the pixels of said wavelength selection element to measure a relationship between an applied voltage and an insertion loss for each of wavelengths of light which is incident on and exits from said wavelength selection element, and putting resultant data in storage.

In the method for calibration of an optically variable filter array apparatus, said detection of the correlation between the x coordinate of said wavelength selection element and the wavelength of incident light may comprise the steps of: putting a plurality of pixel groups in the form of lines into a passage state in a direction perpendicular to the wavelength dispersion direction in said wavelength selection element; scanning wavelength on a wavelength variable light source for producing output of single-spectrum light within a wavelength range including wavelengths with which the optically variable filter array apparatus can be controlled for an input of wavelength-scanned light; and establishing of correlation in a manner such that, when an output corresponding to a line in a passage state of said wavelength selection element is produced from said optically variable filter array apparatus, on the basis of a wavelength of incident light found at the time of emission and the coordinates of a pixel in a passage state, the wavelength is correlated with the x coordinate of the wavelength selection element.

In the method for calibration of an optically variable filter array apparatus, in said plurality of lines in a light passage state, part of the lines may be made lower in passage rate than other lines, and a correlation may be established between the wavelength of incident light found at the time of emission and the x coordinate of the wavelength selection element on the basis of a level of output from a pixel in a passage state.

In the method for calibration of an optically variable filter array apparatus, said detection of a correlation between a y coordinate of said wavelength selection element and an incident region on which wavelength-dispersion light is incident may comprise the steps of: setting a group of pixels in the form of a line crossing diagonally said wavelength selection element defined by a predetermined function into a passage state; scanning wavelength on the wavelength variable light source for producing output of single-spectrum light within a wavelength range including the wavelengths with which the optically variable filter array apparatus can be controlled for an input of wavelength-scanned light; determining an x coordinate corresponding to a wavelength based on a wavelength of the wavelength-scanned light at a timing of acquisition of light which has passed through said optically variable filter array apparatus; identifying a y coordinate on the basis of the x coordinate thereby determined by using the predetermined function; and putting the relationship between the incident light for said optically variable filter array and the y coordinate of the wavelength selection element which receives the incident light in storage.

In the method for calibration of an optically variable filter array apparatus, process for determination of a relationship between insertion loss of light and a voltage to be applied to each pixel may comprise the steps of: when voltages for said wavelength selection element are assumed to fall in a range from $V_0$ to $V_K$ (K represents a natural number of at least 2), applying a given voltage $V_i$ among them (i falls in a 0- to K range) to each and every pixel of said wavelength selection element; scanning wavelength on the wavelength variable light source for producing output of single-spectrum light within a wavelength range including the wavelengths with which the optically variable filter array apparatus can be controlled for an input of wavelength-scanned light to said optically variable filter array apparatus; detecting of a level of light outputted through an incident region on said wavelength selection element upon application of the voltage $V_i$ for each of the pixels arranged in the x-axis direction on an individual basis; executing of the same operation as described above, with the applied voltage $V_i$ varying from $V_0$ to $V_K$ within the range of setting of voltages to be applied to said wavelength selection element; and putting of resultant data indicative of the applied voltage-insertion loss relationship as to every pixel of each incident region in storage.

In the method for calibration of an optically variable filter array apparatus, said optically variable filter array apparatus may be a reflection-type optically variable filter array apparatus in which said wavelength selection element effects filtering by varying light reflection characteristics of each pixel.

In the method for calibration of an optically variable filter array apparatus, said optically variable filter array apparatus may be a transmission-type optically variable filter array apparatus in which said wavelength selection element effects filtering by varying light transmission characteristics of each pixel.

As particularized heretofore, according to the present invention, in an optically variable filter array apparatus using a wavelength selection element having a plurality of pixels, a relationship between input light and its wavelength and coordinates of the pixels of the wavelength selection element can be determined. On the basis of the relationship, it is possible to select light of a given wavelength with respect to a WDM signal of at least one channel, as well as to vary the wavelength selection characteristics as desired. In addition to that, a desired passage rate can be obtained by varying a voltage to be applied to each pixel of the wavelength selection element.

BRIEF DESCRIPTION OF THE DRAWINGS

FIG. 2A is a diagram showing the optical arrangement of a transmission-type optically variable filter array apparatus subjected to calibration in accordance with the present invention, as seen in the x-axis direction;

DESCRIPTION OF THE PREFERRED EMBODIMENTS (Optically Variable Filter Array Apparatus)

Figure 1A:
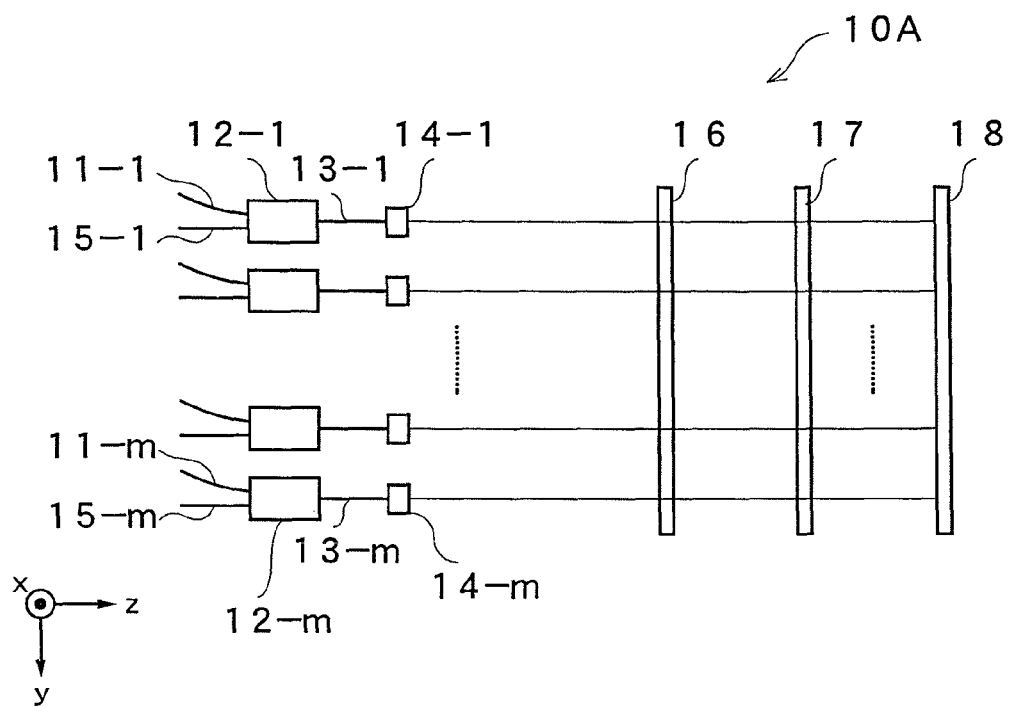
FIG. 1A is a diagram showing the optical arrangement of a reflection-type optically variable filter array apparatus subjected to calibration in accordance with the present invention, as seen in an x-axis direction.
Figure 1B:
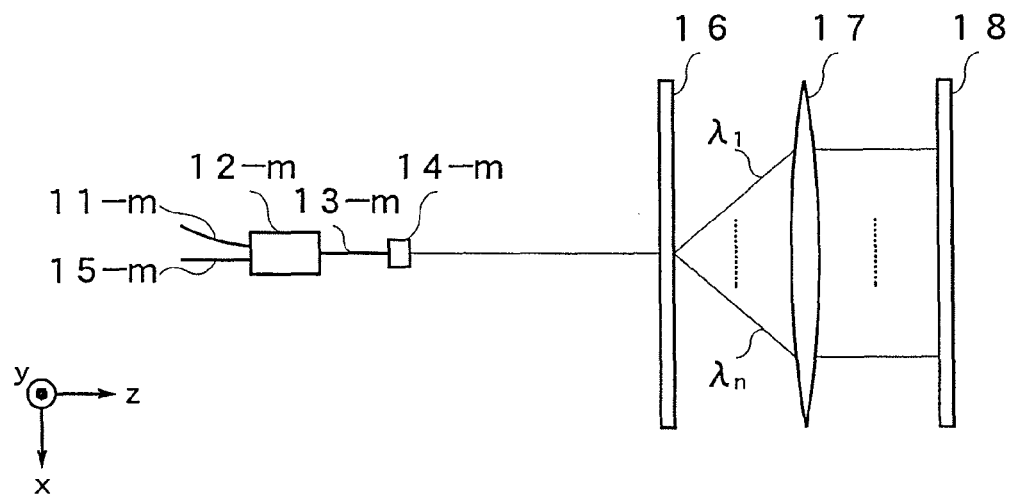
FIG. 1B is a diagram showing the optical arrangement of the optically variable filter array apparatus as seen in a y-axis direction.

FIG. 1A is a side view as seen in the direction of an x axis showing a configuration of optical elements constituting a reflection-type optically variable filter array apparatus 10A subjected to calibration of the present invention. FIG. 1B is a side view showing the apparatus as seen in the direction of a y axis. Incoming light is WDM signal light corresponding to m channels, and WDM light of each channel results from multiplexing of optical signals ranging in wavelength from $\lambda_1$ to $\lambda_n$. The beams of WDM light of the first to m-th channels are fed, through optical fibers 11-1 to 11-$m$, respectively, to circulators 12-1 to 12-$m$, respectively. The beams of incoming light can be either inputted to their respective circulators 12-1 to 12-$m$ via their respective optical fibers 11-1 to 11-$m$ or inputted directly to the circulators. The circulators 12-1 to 12-$m$ allow the incoming light beams to exit, through optical fibers 13-1 to 13-$m$, respectively, to collimator lenses 14-1 to 14-$m$, respectively, and also allow light beams coming from the optical fibers 13-1 to 13-$m$, respectively, to exit to optical fibers 15-1 to 15-$m$, respectively. Moreover, the light beams that exited from their respective collimator lenses 14-1 to 14-$m$ via their respective optical fibers 13-1 to 13-$m$ are parallel to each other in a z axis direction and incident on a wavelength dispersion element 16. The wavelength dispersion element 16 acts to disperse light in different directions on an xz plane according to wavelength. Herein the wavelength dispersion element 16 may be constructed of a transmission-type or reflection-type diffraction grating or a prism or the like, or may be constructed of a combination of a diffraction grating and a prism. The dispersed light beams from the wavelength dispersion element 16 are fed to a cylindrical lens 17. The cylindrical lens 17 is a light condensing element for condensing light beams dispersed on an xz plane in a direction parallel to the z axis. The condensed light is incident perpendicularly on a wavelength selection element 18.

It is noted that, FIG. 1B shows light having the longest wavelength $\lambda_1$ and light having the shortest wavelength $\lambda_n$ by way of example. However, incoming light is in reality WDM signal light having a multiplicity of spectra in a range from the wavelength $\lambda_1$ to the wavelength $\lambda_n$. Therefore the beams of WDM signal light corresponding to m channels developed over the xz plane are directed, in a strip-like form, to the wavelength selection element 18. The wavelength selection element 18 reflects incoming light beams in a selective manner. The selection characteristics of the optical filter are determined on the basis of the reflection characteristics of the wavelength selection element 18, which will hereinafter be described in detail. The light beams reflected from the wavelength selection element 18 pass through the same path to enter the cylindrical lens 17, and are then directed to the wavelength dispersion element 16 once again. In the wavelength dispersion element 16, the reflected light is condensed in the same direction as the condensing direction of the original incoming light, and the condensed light is incident in the same path as that taken by the incoming light to their respective optical fibers 13-1 to 13-$m$ through their respective collimator lenses 14-1 to 14-$m$. The light beams are then outputted to their respective optical fibers 15-1 to 15-$m$ by their respective circulators 12-1 to 12-$m$. Herein the optical fibers 11-1 to 11-$m$, 13-1 to 13-$m$, and 15-1 to 15-$m$, the circulators 12-1 to 12-$m$, and the collimator lenses 14-1 to 14-$m$ constitute an entrance/exit section for receiving WDM signal light beams of m channels and allowing the exit of selected light.

A reflective-type optically variable filter array apparatus comprises: an entrance/exit section for a plurality of channels arranged along a direction of a y axis, which receives WDM signal light beams of a first to m-th channels, each of which is composed of multi-wavelength light, and allows exit of optical signals of selected multiplex wavelengths on a channel to channel basis; a wavelength dispersion element which spatially disperses said WDM signal light beams of different channels according to their wavelengths; a light condensing element which condenses the WDM light beams of different channels dispersed by said wavelength dispersion element on a two-dimensional xy plane; a wavelength selection element which has a multiplicity of pixels that are arranged in a direction of an x axis according to wavelength, are placed so as to receive incoming light beams of m channels arranged at different positions with respect to the y axis so as to be developed over the xy plane, and are arranged in a lattice pattern on the xy plane, and which selects light in a desired number of wavelength bands with respect to a desired number of said light beams by changing reflection characteristics of each of the pixels arranged in a two-dimensional fashion; and a wavelength selection element driving unit which drives an electrode of each of the pixels arranged in the x-y directions of said wavelength selection element to control light reflection characteristics of a pixel lying at a predetermined position in the x-axis direction as well as in the y-axis direction.

Figure 2B:
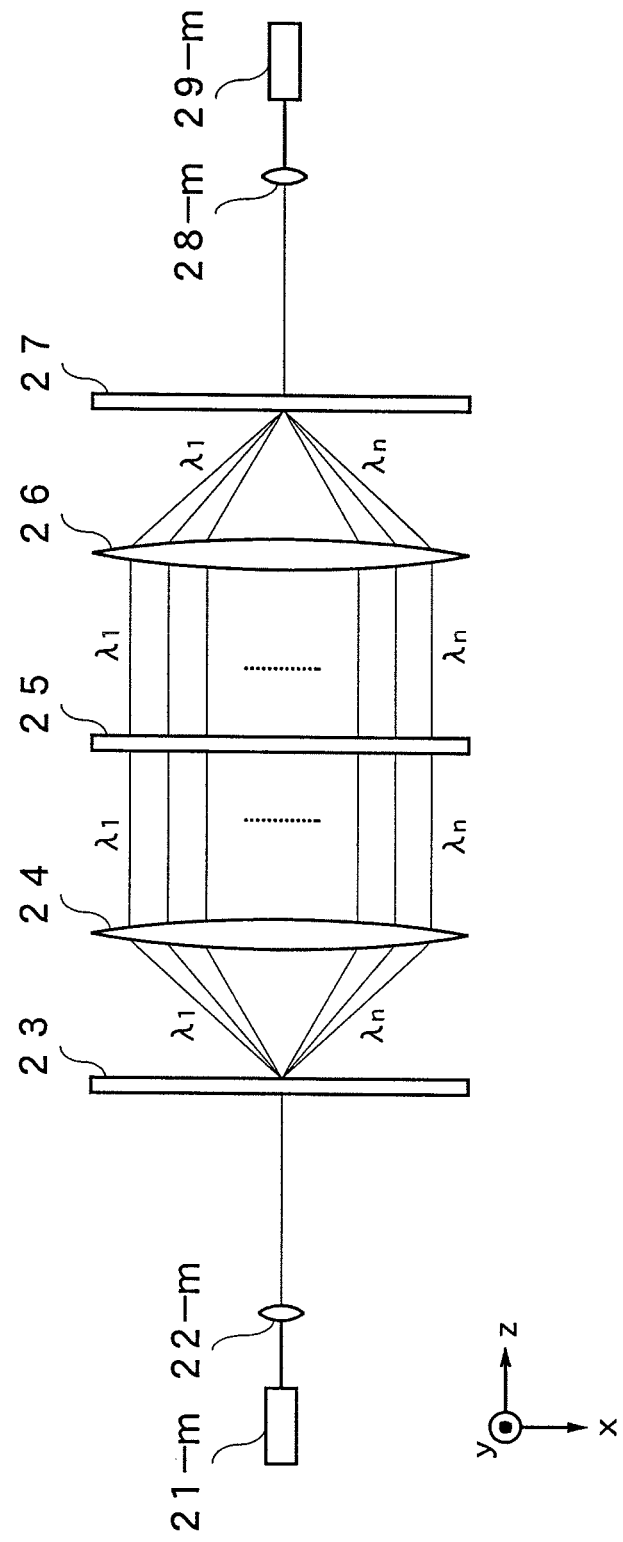
FIG. 2B is a diagram showing the optical arrangement of the optically variable filter apparatus as seen in the y-axis direction.

Next, a description will be given as to a transmission-type optically variable filter array apparatus 10B subjected to calibration of the present invention. In FIG. 2A, incoming light is WDM signal light corresponding to m channels, and the light beams are directed from optical fibers 21-1 to 21-$m$, respectively, to collimator lenses 22-1 to 22-$m$, respectively, so as to be fed to a first wavelength dispersion element 23. The optical fibers 21-1 to 21-$m$ and the collimator lenses 22-1 to 22-$m$ constitute entrance sections for receiving the beams of WDM signal light of the first to m-th channels. The first wavelength dispersion element 23, just like the wavelength dispersion element 16, can be constructed of a diffraction grating or a prism, or can be constructed of a combination of a diffraction grating and a prism. As shown in FIG. 2B, the wavelength dispersion element 23 allows light beams to exit therefrom in different directions on the xz plane according to their wavelengths. The light beams are incident on a cylindrical lens 24. The cylindrical lens 24 is a first light condensing element for condensing light beams dispersed on the xz plane in a direction parallel to the z axis. Moreover, a wavelength selection element 25 is disposed perpendicularly to the optical axis of the cylindrical lens 24. The wavelength selection element 25 transmits of incoming light in a selective manner, which will hereinafter be described in detail. The light transmitted through the wavelength selection element 25 is incident on a cylindrical lens 26. A pair of the cylindrical lens 24 and the first wavelength dispersion element 23 and a pair of the cylindrical lens 26 and a wavelength synthesizing element 27 are arranged in plane-symmetrical relation with respect to the xy plane at the center of the wavelength selection element 25. The cylindrical lens 26 is a second light condensing element for condensing parallel light beams on the xy plane. The wavelength synthesizing element 27 effects the synthesis of light beams of different wavelength components coming from different directions so that they can exit therefrom in a synthesized state. The synthesized light beams of different channels are fed, through collimator lenses 28-1 to 28-$m$, respectively, to optical fibers 29-1 to 29-$m$, respectively. The collimator lenses 28-1 to 28-$m$ and the optical fibers 29-1 to 29-*m* constitute exit sections for a plurality of channels that allow the exit of WDM signals with a selected wavelength on a channel to channel basis.

A transmission-type optically variable filter array apparatus comprises: an entrance section which is arranged along a direction of a y axis and receives WDM signal light beams of a first to m-th channels composed of multi-wavelength light; a dispersion element which spatially disperses said WDM signal light beams of different channels according to their wavelengths; a first light condensing element which condenses the WDM light beams of different channels dispersed by said dispersion element on a two-dimensional xy plane; a wavelength selection element which has a multiplicity of pixels that are arranged in a direction of an x axis according to wavelength, are placed so as to receive incoming light beams of m channels arranged at different positions with respect to the y axis so as to be developed over the xy plane, and are arranged in a lattice pattern on the xy plane, and which selects light in a desired number of wavelength bands with respect to a desired number of light beams by changing transmission characteristics of each of the pixels arranged in a two-dimensional fashion; a wavelength selection element driving unit which drives electrodes arranged in the x-y directions of said wavelength selection element to control light transmission characteristics of a pixel lying at a predetermined position in the x-axis direction as well as in the y-axis direction; a second light condensing element which condenses light beams of different wavelengths transmitted through said wavelength selection element; a wavelength synthesizing element which effects synthesis of dispersed light condensed by said second light condensing element; and an exit section corresponding to a plurality of channels, which allows exit of WDM signals of selected wavelengths on a channel to channel basis.

(Configuration of Wavelength Selective Element)

Next, the wavelength selective elements 18, 25 used in the optically variable filter apparatuses will be described below. In the wavelength selective elements, when the incident light beams are dispersed on the xz plane according to wavelength and the dispersed light beams are incident on the wavelength selective elements 18, 25. Incident regions are defined as rectangular regions R1 to Rm shown in FIG. 3. That is, the light beams applied to the incident regions R1 to Rm are essentially the WDM light beams of the first to the m-th channels developed over the xy plane according to channel and wavelength band. The reflection-type optically variable filter apparatus can select light beams of desired wavelength by selecting corresponding pixels for reflection. The transmission-type optically variable filter apparatus can select light beams having desired wavelength by selecting corresponding pixels for transmission. A setting part 30 is connected to each of the wavelength selective elements 18, 25 through a driver 31. The setting part 30 determines the pixels that reflect or transmit light on the xy plane according to selected wavelength. The setting part 30 and driver 31 constitute a wavelength selective element driving unit for driving each of pixel electrode plates arranged in the xy direction of the wavelength selective element to control characteristics of pixels located at predetermined positions in the x-axis and y-axis directions.

Next, specific examples of the wavelength selective element 18 in the apparatus 10A will be described. A first example of the wavelength selective element 18 is a reflection-type LCOS (Liquid Crystal on Silicon)-based liquid crystal element (hereinafter referred to as LCOS element) 18A. The LCOS element 18A has a built-in liquid crystal modulation driver located at the back of the element. Accordingly, the number of pixels can be increased, and thus, the LCOS element 18A can be formed of a lot of pixels arranged, for example, in a 1920×1000 lattice pattern. In the LCOS element 18A, since light beams are incident separately at different positions according to their wavelengths and channels, by bringing pixels corresponding to the incidence position of a target light beam into reflective state, it is possible to select the light beam of a specific wavelength.

Figure 4A:
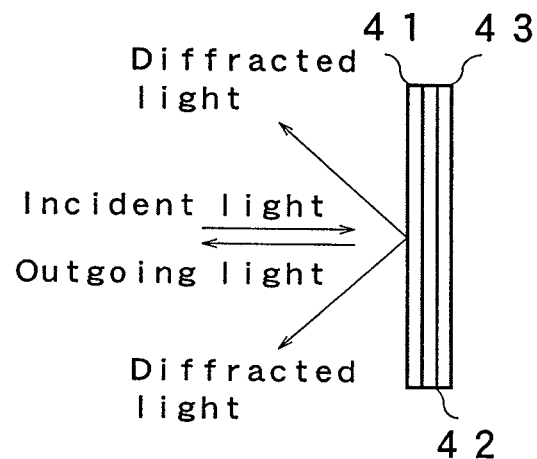
FIG. 4A is a diagram showing an example of a modulation mode for a LCOS element employed in the optically variable filter array apparatus.

Now, as one of modulation modes applicable to the LCOS element 18A, a phase modulation mode will be explained. FIG. 4A is a schematic diagram showing the LCOS element 18A. The LCOS element 18A is composed of a transparent electrode 41, liquid crystal 42 and back reflection electrode 43 that are arranged from an incident side plane along the z-axis direction in a layered structure. In the LCOS element 18A, since a plurality of pixels are assigned to positions corresponding to one wavelength and channel, it is possible to impart unevenness to a refractive index profile with respect to a plurality of pixels and thereby develop a diffraction phenomenon based on multi-level optical phased array by applying a voltage between the transparent electrode 41 and back reflection electrode 43 for the plurality of pixels. In addition, the diffraction angles of different wavelength components can be controlled independently, so that an input light beam having a specific wavelength can be simply reflected in the incident direction, and light beams of other wavelength components can be diffracted as unnecessary light beam and reflected in a direction different from the incident direction.

Figure 4B:
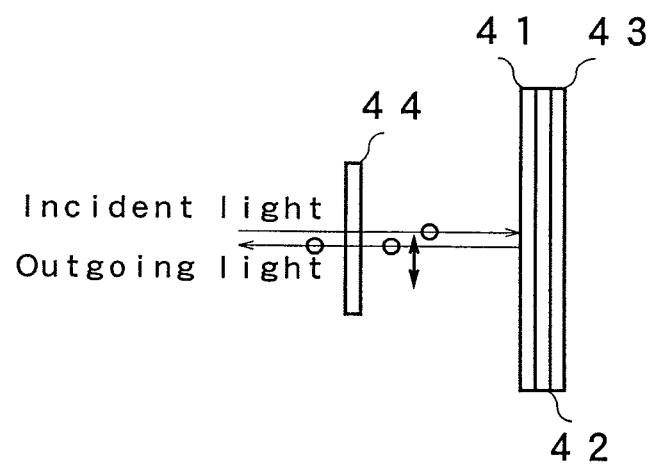
FIG. 4B is a diagram showing another example of the modulation mode for the LCOS element employed in the optically variable filter array apparatus.

Next, as another modulation mode applicable to the LCOS element 18A, an intensity modulation mode will be explained. FIG. 4B is a diagram showing a wavelength selective method based on the intensity modulation mode. A polarizer 44 is placed on an incidence plane for incident light. The polarizer 44 brings incident light into a specific polarized state as indicated by a circle in the diagram, and the polarized light is incident on the reflection-type LCOS element 18A. Also in this case, the LCOS element 18A is composed of the transparent electrode 41, liquid crystal 42 and back reflection electrode 43. In the LCOS element 18A, a difference in the double refraction index in the liquid crystal between the electrodes can be controlled on the basis of the voltage application conditions. Accordingly, a polarization state of reflected light can be varied by controlling the polarization state of the pixels to which the voltage is applied. Then, it is determined whether or not a polarization plane is rotated or retained at the time of voltage control in accordance with orientation ordering among liquid-crystal molecular components. For example, assuming that the polarization plane is retained in the absence of voltage application, the light indicated by the circle is simply reflected. On the other hand, in the presence of voltage application, the polarization plane is rotated to effect reflection, and thus the reflected light is shielded by the polarizer 44. Accordingly, by controlling the voltage applied to the pixels, the incident light can be brought from the reflective state to the non-reflective state. By bringing desired pixels in the x-axis direction into the reflective states, it is possible to select light beams of desired wavelengths among desired WDM light beams.

As a second example of the wavelength selective element 18, a liquid crystal element 18B having a reflection-type two-dimensional electrode array will be described. The liquid crystal element 18B has no LCOS structure. The LCOS element has the built-in liquid crystal driver disposed at the back of each pixel. On the other hand, in the liquid crystal element 18B, the liquid crystal modulation driver is provided at the outside of the element 18B. The other configuration of the liquid crystal element 18B is the same as that of the LCOS element and can achieve the phase modulation mode based on above-mentioned multi-level phased array and intensity modulation mode.

As a third example of the wavelength selective element 18, the two-dimensional MEMS element 18C will be described. The MEMS element in which a lot of MEMS mirrors are two-dimensionally arranged has been put into practical use as a Digital Micromirror Device (DMD). It is assumed that all pixels in one column of the MEMS mirror in the y-axis direction correspond to one wavelength of the WDM signal. Also in the case of MEMS, since a plurality of pixels of the MEMS element are associated with one wavelength band, the reflectance can be varied by controlling voltages applied to many pixels associated with one wavelength and performing phase modulation based on multi-level optical phased array and intensity modulation.

Next, the transmission-type wavelength selective element 25 used the filter array apparatus 10B will be described. As a first example of the wavelength selective element 25, a transmission-type LCOS element 25A can be employed. The LCOS element 25A has a transparent electrode in place of the back reflection electrode 43. Also in the LCOS element 25A, a phase modulation mode based on multi-level optical phased array and the intensity modulation mode can be applied.

As a second example of the wavelength selective element 25, a liquid crystal element 25B having a transmission-type electrode array can be employed. The liquid crystal element 25B has no LCOS structure. The LCOS element has the built-in liquid crystal driver disposed at the back of each pixel. On the other hand, in the liquid crystal element 25B, the liquid crystal modulation driver is provided at the outside of the liquid crystal element 25B. The other configuration of the element 25B is the same as that of the LCOS element and can achieve the above-mentioned phase modulation mode and intensity modulation mode.

(Calibration of an Optically Variable Filter Array Apparatus)

Figure 5:
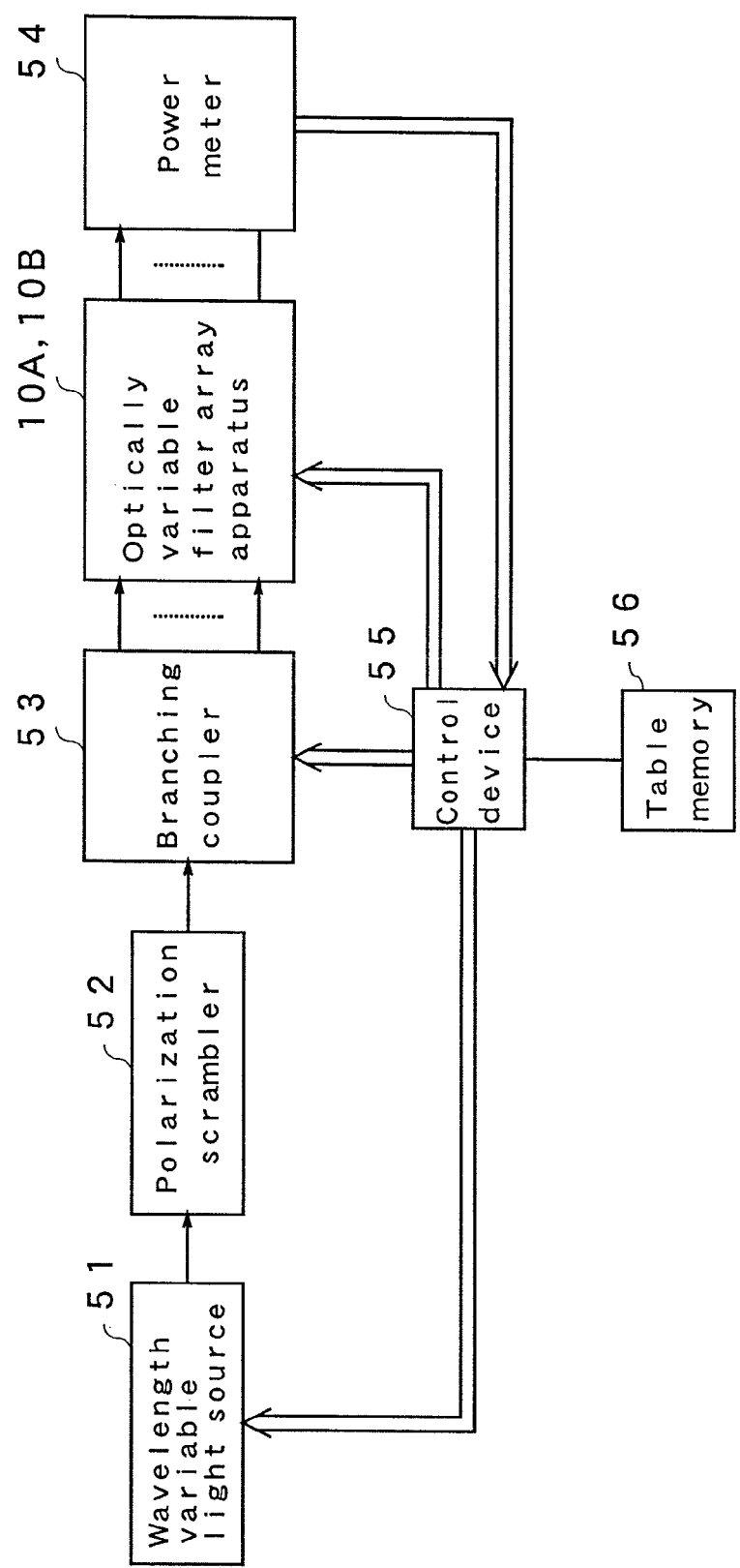
FIG. 5 is a block diagram for calibration operation employed in an embodiment of the present invention.

Now, a description will be given as to a calibration method for the attainment of correlation between each pixel and a WDM signal and its wavelength in accordance with an embodiment of the present invention. FIG. 5 is a block diagram showing a calibration system for the determination of pixel positions and characteristics of the wavelength dispersion element according to wavelength. In the diagram, a wavelength variable light source 51 is a light source of wavelength scanning type capable of causing light of single wavelength to change continuously within a wavelength band used for an optically variable filter array apparatus in a longest wavelength $\lambda_1$ to shortest wavelength $\lambda_n$ range, and permitting the exit of light of varying wavelength. In this embodiment, the light source 51 is configured for wavelength scanning at a predetermined speed in response to an external signal and output of wavelength-scanned light. The output from the wavelength variable light source 51 is fed, via a polarization scrambler 52, to a branching coupler 53. The branching coupler 53 branches a polarization-scrambled light signal into any number of components (to a maximum of m). The branched components are outputted to the aforementioned filter array apparatus 10A or 10B as incident light. Then, outgoing light from the filter array apparatus 10A or 10B is incident on a power meter 54. The power meter 54 effects output detection on a channel-by-channel basis, and provides output of resultant output-level data to a control device 55. On the basis of a wavelength outputted from the wavelength variable light source 51, a pixel assigned as a target for output of input light by the optically variable filter array apparatus, and an output level detected by the power meter 54, the control device 55 performs computation on a pixel-wavelength correlation and output characteristics and stores the result of computation in a table memory 56.

Next, the details of the calibration method will be described below. The calibration operation of this method involves:

(1) Determination of wavelength at x coordinate;
(2) Determination of correlation between input light and y coordinate; and
(3) Determination of level of insertion loss.

It is noted that, in the reflection-type optically variable filter apparatus 10A, part of incident light is returned to the output side by bringing each pixel of a wavelength selection element 18 into a reflection state. In the transmission-type optically variable filter apparatus 10B, part of incident light is returned to the output side by bringing each pixel of a wavelength selection element 25 into a transmission state. Accordingly, in either case, the passage of light is permitted as viewed in the optically variable filter array apparatus, and the extent of light passage can be expressed in terms of the level of insertion loss. In the following description, the reflection state of each pixel of the wavelength selection element 18 and the transmission state of each pixel of the wavelength selection element 25 will be collectively referred to as "passage state".

(Determination of Wavelength of x-Coordinate)

Figure 3:
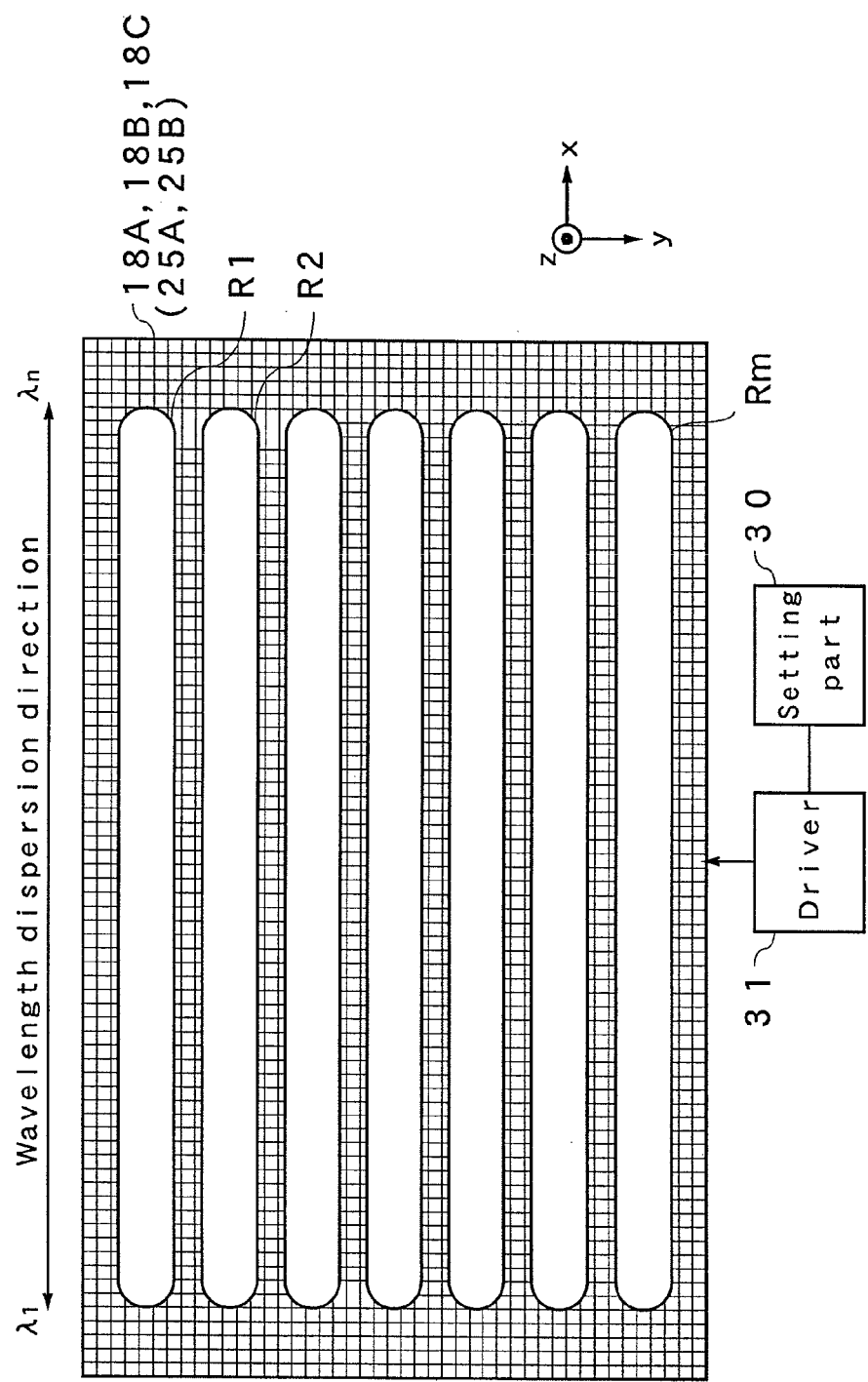
FIG. 3 is a diagram showing a wavelength selection element employed in the optically variable filter array apparatus and peripheral circuitry.
Figure 6:
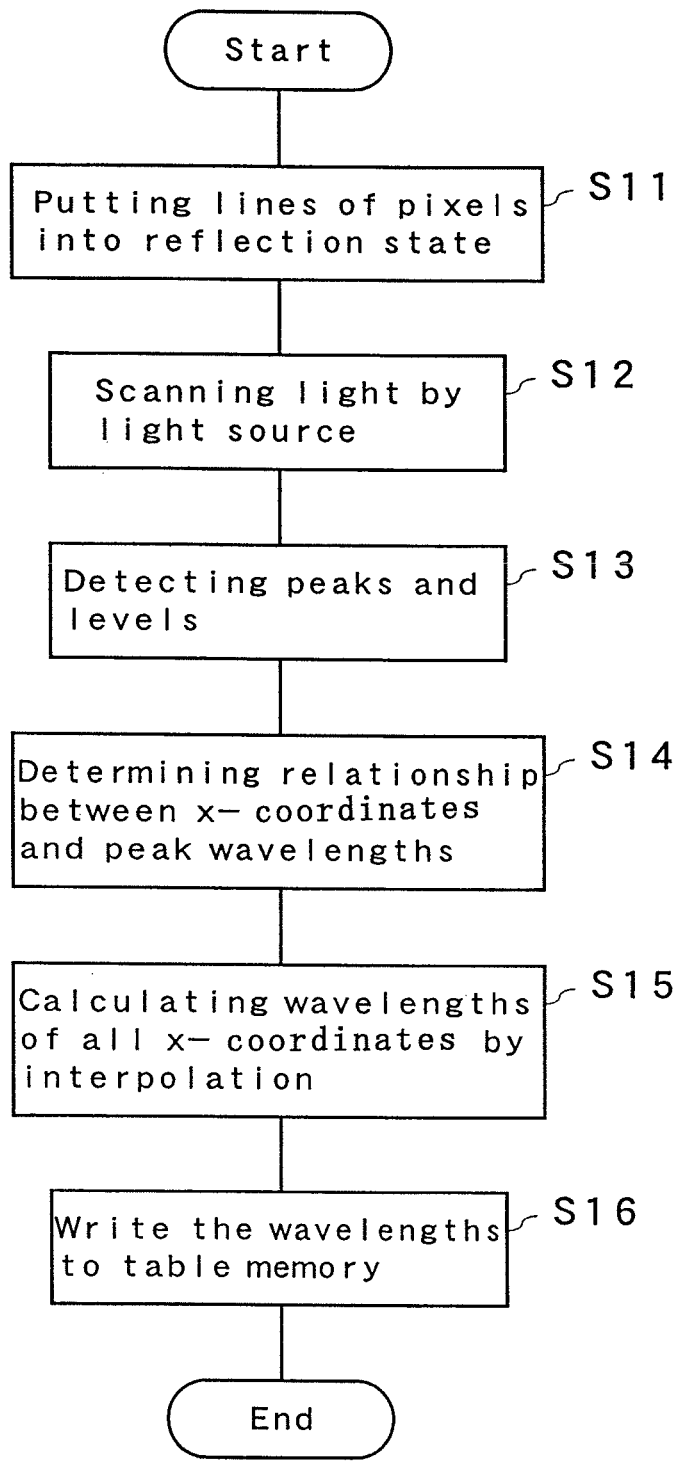
FIG. 6 is a flow chart showing procedural steps of a process to determine wavelengths corresponding to x-coordinates in accordance with the embodiment of the present invention.

As shown in FIG. 3, the direction of the x axis conforms to a wavelength dispersion direction. It is necessary to determine which wavelengths shall be correlated with the pixels in the wavelength dispersion direction on the wavelength selection element 18 on a pixel-by-pixel basis. In this embodiment, this determination process is conducted in accordance with a flow chart shown in FIG. 6. It is noted that the following description will deal with calibration of a LCOS element 18A which is subjected to intensity modulation in the optically variable filter apparatus 10A. In the LCOS element 18A shown in FIG. 7, the x coordinates, as well as the y coordinates, of the pixels fall in the range from (x1, y1) to (x1920, y1000). In Step S11 as a first step, the control device 55 places the pixels constituting each of a plurality of lines indicated by cross-hatching, for example, an array of all the pixels whose x coordinate is represented by the value of 100 (x100) arranged parallel to the y-axis direction and an array of all the pixels whose x coordinate is represented by the value of 300 (x300) arranged parallel to the y-axis direction, into a reflection state. By doing so, when light is incident on a pixel in the reflection state, part of the light is allowed to return to the output side, with a consequent reduction in insertion loss in the reflection-type optically variable filter apparatus 10A in itself. In order to facilitate the determination of the x coordinates, part of the pixel lines, for example, the centrally-located line whose x coordinate is defined by $x_c$, is adjusted to be smaller in reflectivity than other pixel lines.

Figure 7:
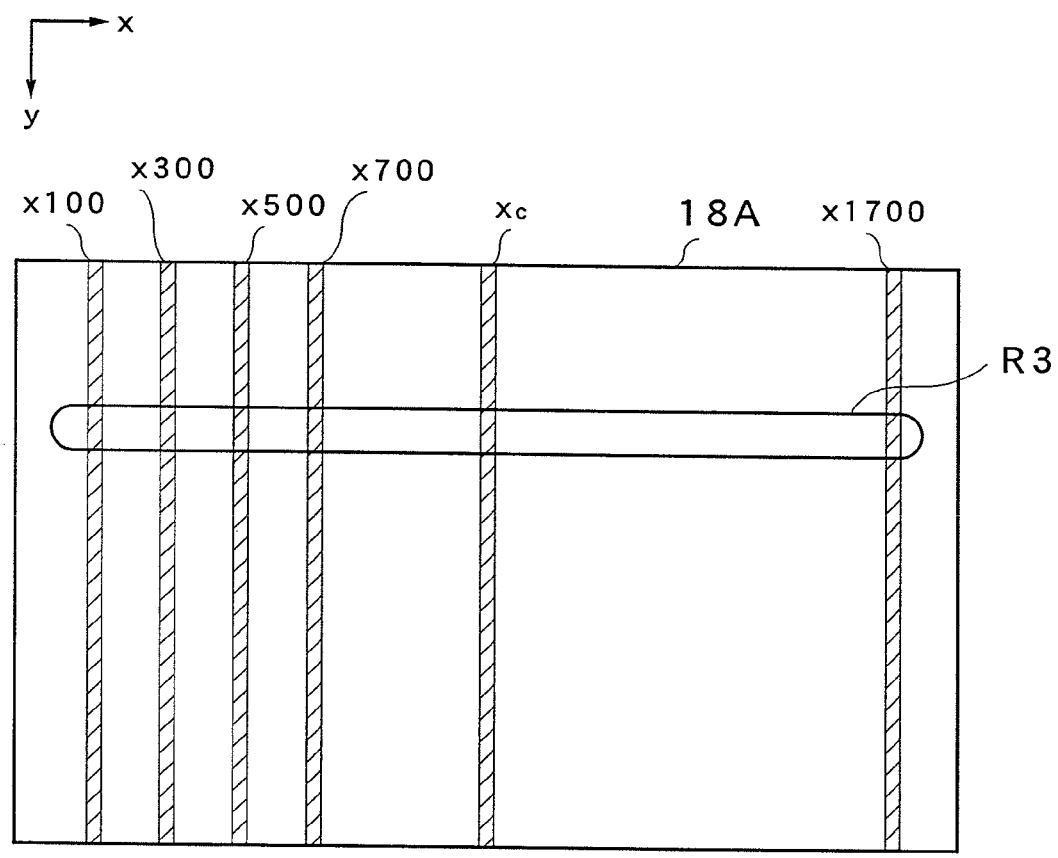
FIG. 7 is a diagram showing the LCOS element in which a group of pixels in a line form is placed in a reflection state in accordance with the embodiment.
Figure 8A:
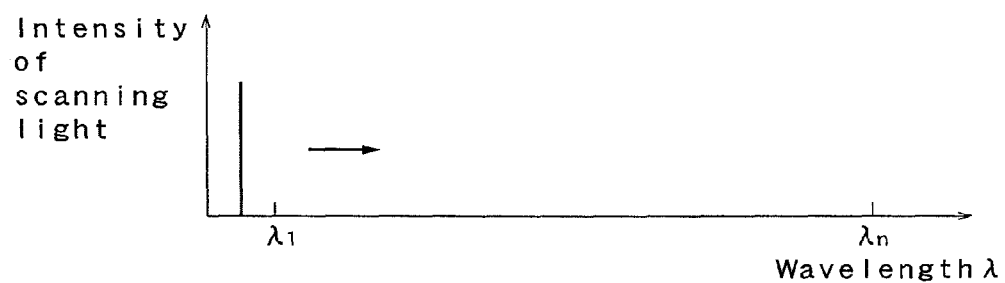
FIG. 8A is a spectral plot showing wavelength-scanned light from a wavelength variable light source 51.
Figure 8B:
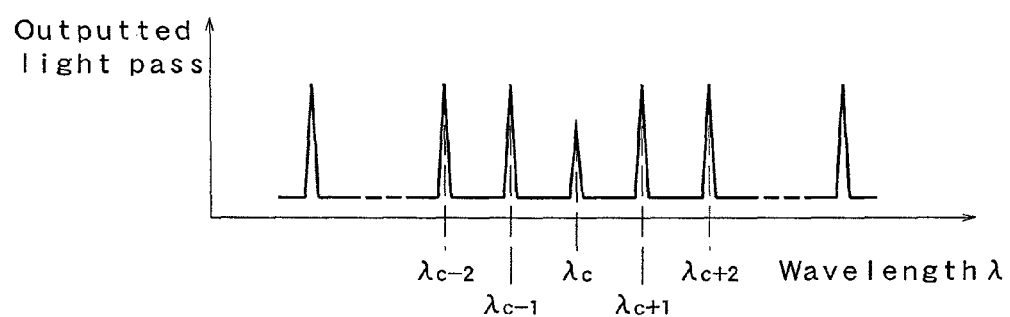
FIG. 8B is a plot showing variation in light output provided to an optical power meter.

Then, in Step 12, the wavelength variable light source 51 produces output of light which has been wavelength-scanned within the range of a wavelength band for use as shown in FIG. 8A. In this way, the output is directed, via the polarization scrambler 52, to the branching coupler 53. The determination of the x-axis coordinate necessitates input of only a single light beam. Therefore the wavelength-scanned light is inputted through one of the optical fibers of the optically variable filter apparatus 10A, for example, the optical fiber 11-3, without effecting branching of light. As shown in FIG. 8A, upon incidence of the wavelength-scanned light through a single optical fiber, then the light scans over the LCOS element 18A through a wavelength dispersion element 16 according to wavelength. An incident region R3 as shown in FIG. 7 represents the path of light corresponding to a single scanning operation. Thus, the light incident on a pixel in a reflection state is reflected therefrom so as to enter the optical fiber 13-3, and the light is then divided by the circulator 12-3 to produce output of light at the side of the optical fiber 15-3. In FIG. 8B, there is shown the path of the light thereby outputted. The output from the optical fiber 15-3 is detected by the power meter 54.

Figure 8C:
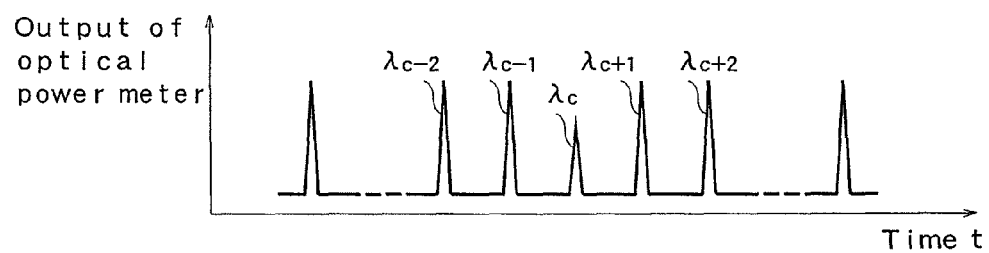
FIG. 8C is a plot showing variation in output provided to the optical power meter in chronological order.

Next, in Step S13, peaks and levels of the output are detected by the power meter 54. In Step S14, a pixel-wavelength correlation is determined on the basis of the relationship between the detected output peaks and wavelengths. For example, as shown in FIGS. 8B and 8C, the wavelength $\lambda_C$ of the centrally-located output peak which is lower in level than other output peaks can be considered to be the light reflected from the aforementioned centrally-located line whose reflectivity is lower than those of other lines. That is, the coordinate $x_c$ of the line corresponds to the wavelength $\lambda_C$. Likewise, assignments of pixel lines in reflection state in each of the wavelengths, including the wavelengths of the output peaks ahead and behind the wavelength $\lambda_C$, namely the wavelengths $\lambda_{C-1}$ and and also the wavelengths of the adjacent output peaks, namely the wavelengths $\lambda_{C-2}$ and $\lambda_{C+2}$, are carried out successively. In this way, each and every pixel line in a reflection state is correlated with wavelength for determination. In Step S15, the wavelengths corresponding to all the x coordinates are calculated by means of numerical interpolation. In Step S16, the wavelengths corresponding to the x coordinates thereby obtained are written into the table memory 56 under the control of the control device 55. The correlation between wavelength and the x coordinate of the pixel of the LCOS element 18A can be determination in that way.

(Determination of Correlation Between Input Light and y Coordinate)

Figure 9:
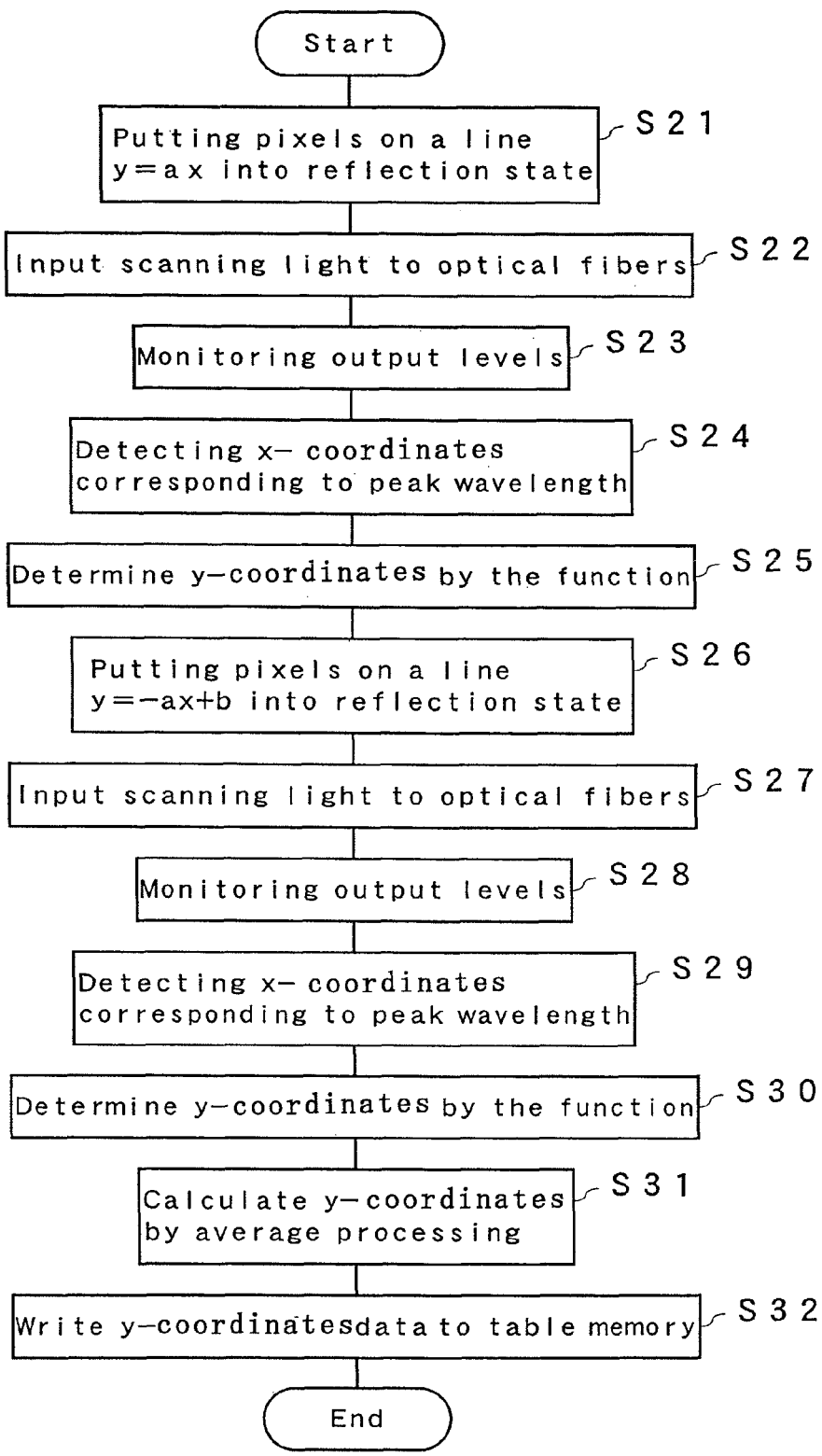
FIG. 9 is a flow chart showing procedural steps of a process to determine a correlation between a y coordinate and input light in accordance with the embodiment of the present invention.
Figure 10A:
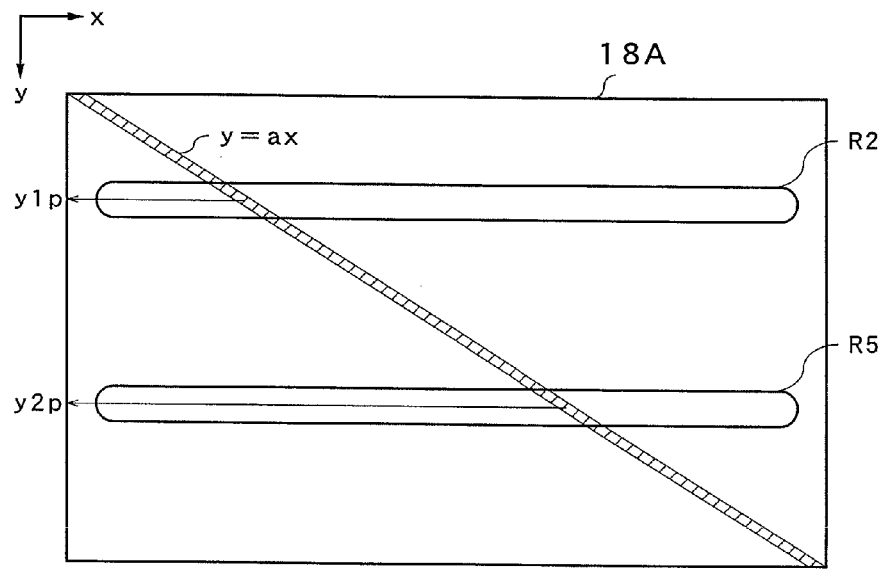
FIG. 10A is a diagram showing light incident regions and pixels on the LCOS element defined by a first function in a reflection state for y-coordinate determination.
Figure 11A:
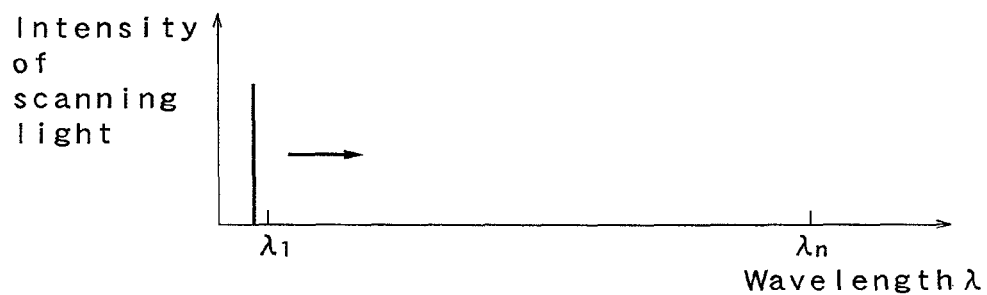
FIG. 11A is a spectral plot showing wavelength-scanned light from the wavelength variable light source 51.
Figure 11B:
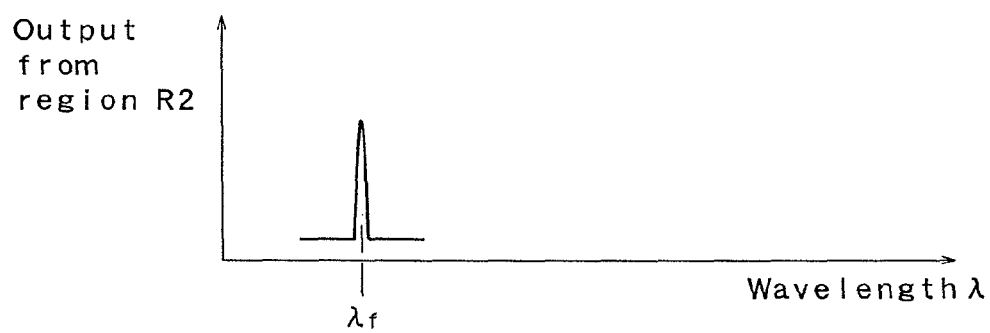
FIG. 11B is a plot showing variation in light output from a certain incident region.
Figure 11C:
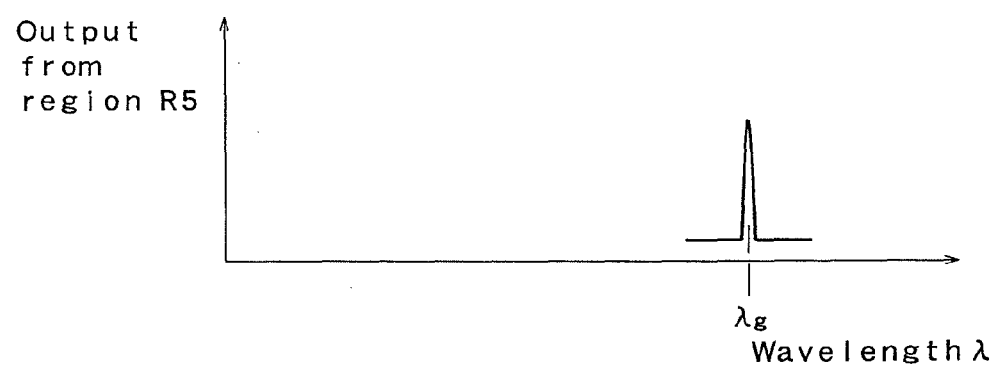
FIG. 11C is a plot showing variation in light output from another incident region.

Next, the determination of locations of y-axis coordinates will be explained. FIG. 9 is a flow chart showing the procedural steps of the determination process. In Step S21 as a first step, as shown in FIG. 10A, the control device 55 specifies a known first function which is represented by a line crossing diagonally the screen of the LCOS element 18A and can thus be expressed in equation form as: y=ax (a>0). The control device 55 brings only the pixels whose x coordinate and y coordinate are defined by this function into a reflection state as indicated by cross-hatching. This makes it possible to obtain output upon incidence of light on these pixels. Then, wavelength-scanned light obtained as the result of scanning in the wavelength variable light source 51 is incident on the polarization scrambler 52, and is whereafter branched into two light beams by the branching coupler 53. The light beams are directed to the wavelength variable filter array 10A. After that, in Step S22, the control device 55 exercises control in a manner that allows a given input optical fiber, for example, the optical fibers 11-2 and 11-5 to receive input, whereupon output can be obtained only at the part of intersection of an incident region R2 and the diagonally extending line defined by the first function and the part of intersection of an incident region R5 and the diagonally extending line. It is noted that, as shown in FIG. 10A, the two incident regions have a certain width including a plurality of pixels in the y-axis direction, wherefore light is shone onto the plurality of pixels. Accordingly, in that part of the light beam through which the first-function line passes diagonally, such output as shown in FIGS. 11B and 11c can be obtained. Among the wavelengths ranging from the output peak to a level exceeding −3 dB, the middle wavelength is defined as a peak wavelength $\lambda_f$, $\lambda_g$ of received light. Thus, in Step S23, the outputs from the two optical fibers are monitored, and an x coordinate corresponding to the peak wavelength of each of the outputs is retrieved from the table memory 56 in which data is already stored (Step S24). In Step S25, on the basis of the first function y=ax, y coordinates corresponding to the x coordinates are obtained by calculation. The y coordinates thereby obtained will be defined as y1p and y2p, respectively.

Figure 10B:
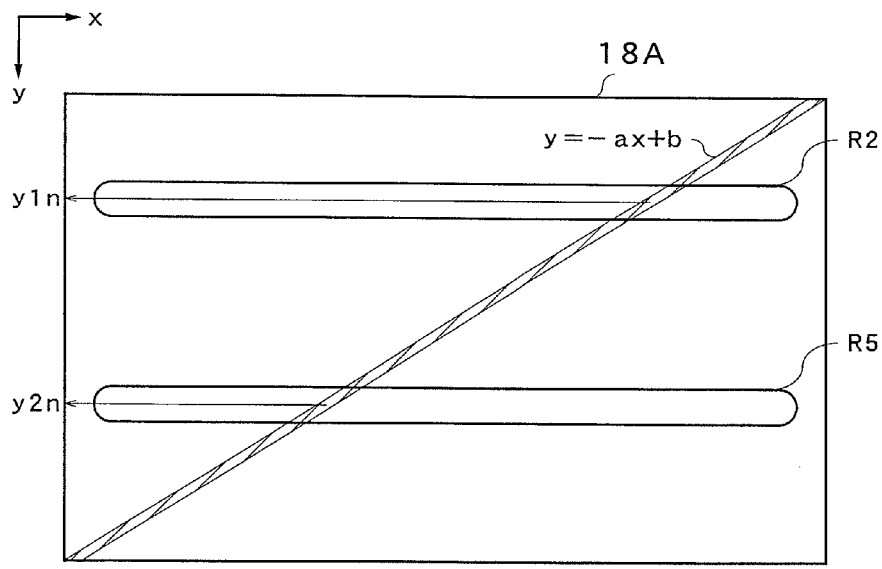
FIG. 10B is a diagram showing light incident regions and pixels on the LCOS element defined by a second function in a reflection state for y-coordinate determination.

Next, in Step S26, the control device 55 specifies a second function. The second function differs in slope from the first known function. As shown in FIG. 10B, the second function is represented by a line crossing diagonally the screen of the LCOS element 18A in the reverse direction and can thus be expressed in equation form as: y=−ax+b (b>0). Subsequently, y coordinates y1n and y2n are calculated by performing the same operation in Steps S27 to S30. Then, as shown below, the two y coordinates y1p and y1n, as well as y2p and y2n, are averaged to produce two y coordinates y1 and y2 (Step S31).

$$y1=(y1p+y1n)/2$$

$$y2=(y2p+y2n)/2$$

In this way, the central y coordinates as to the incident light beams from the two optical fibers can be determined by calculation. Such a process is preferably performed on all of the incident regions R1 to Rm on which light beams are incident one after another, respectively, from all of the optical fibers. Alternatively, in a case where the optical system is so designed that light beams are incident equidistantly on the LCOS element 18A, any given upper and lower incident regions, for example, R1 and Rm or other upper and lower light-receiving regions situated between R1 and Rm, may be subjected to the calculation process to derive the central y coordinate of each of the incident regions by means of interpolation. In this way, the central y coordinate corresponding to each channel can be determined. Then, the control device 55 writes the determined y coordinate data to the table memory 56 (Step S32).

According to the abovementioned method, calculation of y coordinate is performed at the intersection of a pixel represented as a function and a light incident region with use of the known first and second functions. However, it is also possible to use only one of the functions for y coordinate calculation without performing averaging computation.

(Determination of Level of Insertion Loss)

Figure 12:
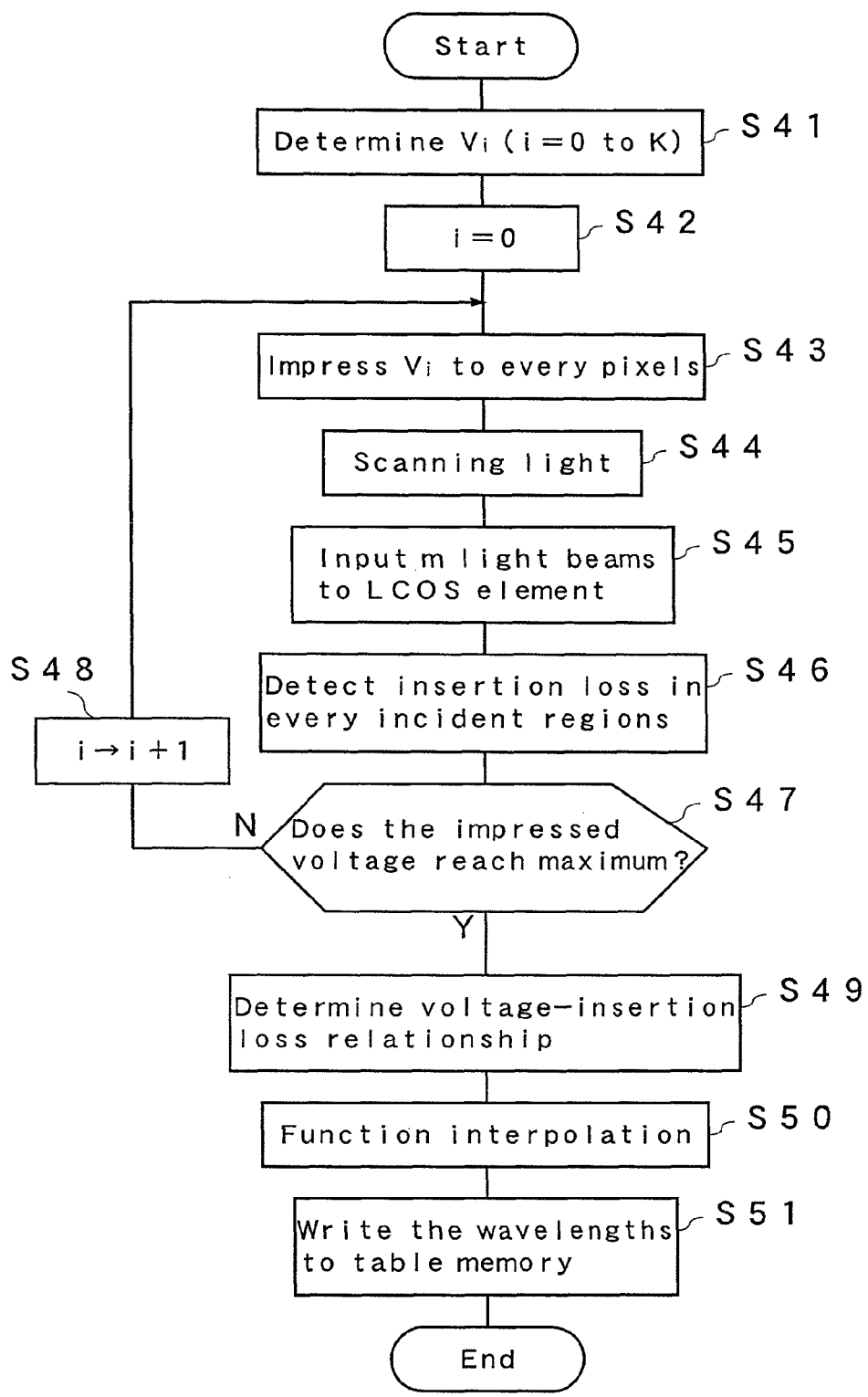
FIG. 12 is a flow chart showing procedural steps of a process to determine the level of insertion loss in accordance with the embodiment of the present invention.
Figure 13:
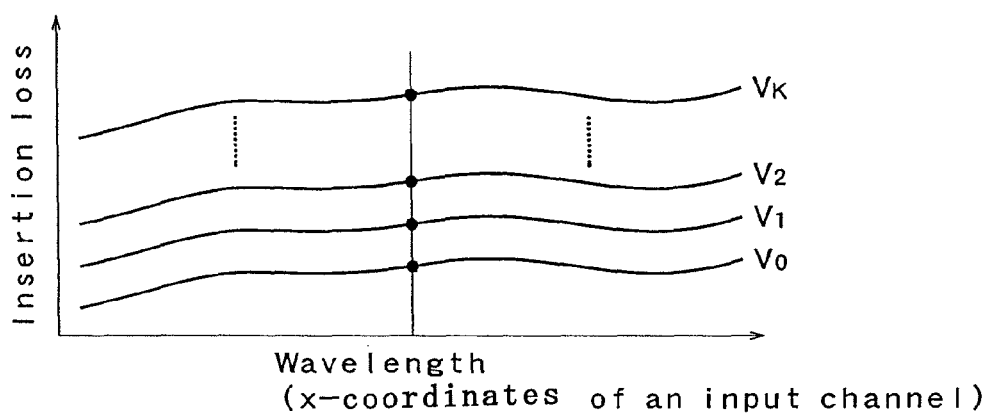
FIG. 13 is a graph showing a relationship between pixels in the x-axis direction with respect to certain incident light and insertion loss and voltage.
Figure 14:
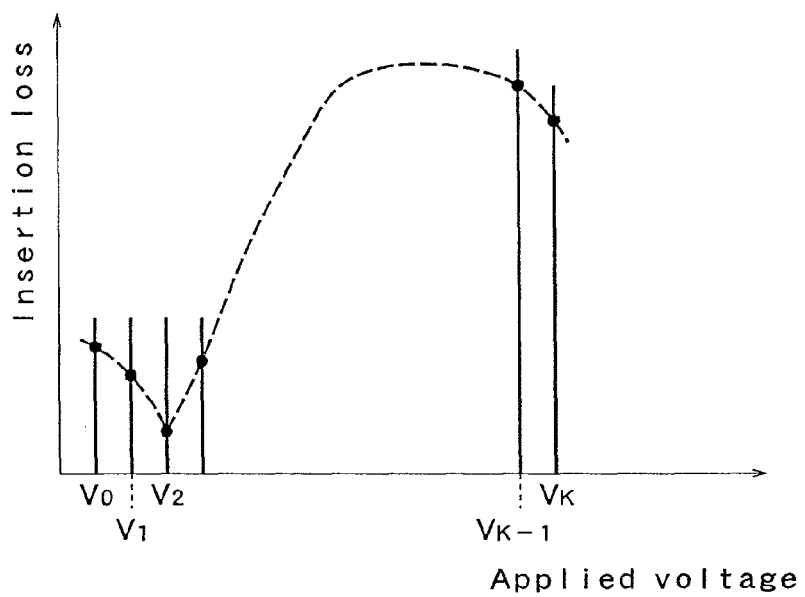
FIG. 14 is a graph showing an applied voltage-insertion loss relationship of a certain pixel.

Next, a description will be given as to a method of determining a relationship between a voltage to be applied to each pixel and insertion loss. In order to use the LCOS element 18A as a filter while establishing its characteristics arbitrarily, it is necessary to determine data on an applied voltage required for each pixel. For example, when it is desired to set the level of insertion loss at one-half, there is a need to know how much an applied voltage is necessary for making insertion loss one-half. FIG. 12 is a flow chart showing the procedural steps of the determination process. To begin with, as shown in Step S41 of FIG. 12, within the range of applied voltages causing changes in reflection state, a minimum voltage and a maximum voltage are derived and the difference between them is divided into K equal portions. K represents a natural number of 2 or above, and a parameter i takes on any natural number from 0 to K. Each of values obtained by equal division of the difference in voltage involving the maximum and minimum values, in other words, each voltage value expressed as K+1 is defined as a voltage $V_i$. Subsequently, in Step S42, the first parameter i is set at 0. Next, in Step S43, a lowest voltage $V_0$ is impressed on each and every pixel of the LCOS element 18A. Then, the procedure proceeds to Step S44 and Step S45 where scanned light is outputted from the wavelength variable light source 51 and a predetermined number of, for example, m pieces of light beams are incident on the LCOS element 18A. In this way, as shown in Step S46, the level of light reflected from each of the incident regions R1 to Rm can be obtained on a pixel-by-pixel basis. A curve $V_0$ depicted in FIG. 13 indicates the insertion loss of light incident on a certain incident region with respect to a pixel in the x-axis direction. Subsequently, whether the voltage $V_i$ is a maximum voltage $V_K$ or not is checked (Step S47). When it is judged that the voltage $V_i$ has not reached the maximum voltage, then the procedure proceeds to Step S48 where the parameter i is incremented, and the procedure returns to Step S43 to perform the same operation. As a result, the level of insertion loss can be determined for each of the voltages $V_0$ through $V_K$ on an input channel-by-input channel basis, thereby producing a graph of insertion loss as shown in FIG. 13. FIG. 14 is a graph plotted on the basis of the insertion loss graph thereby obtained, indicating the insertion loss corresponding to a pixel at a certain location with respect to applied voltages for the input channel. In this way, a voltage-insertion loss relationship is determined for each pixel on an individual basis. The determination process may be performed for each group of pixels whose x coordinates have a y coordinate constituting the center of the incident region R1 to Rm on an individual basis. Moreover, in order to reduce the number of process steps, the determination of a voltage-insertion loss relationship may be made for each of given groups of pixels arranged at a predetermined spacing on an individual basis. In this case, as shown in Step S50, applied voltages may be determined therefor by means of function interpolation such as spline interpolation.

Next, in Step S51, the insertion loss data thereby obtained is set in the table memory 56. The voltages between $V_0$ and $V_K$ need to be set at values corresponding to the resolution set practically for the optically variable filter array by a setting section 30 as shown in FIG. 3, wherefore the values are derived in advance by function interpolation such as spline interpolation. The data thereby obtained may be stored in the table memory. Moreover, function interpolation may be executed at the time of actual voltage application. In this way, the level of voltages to be applied for determination of pixel positions for incident light, on-y-axis locations of incident channels, and desired transmittance can be determined.

It is noted that the insertion loss measurement does not necessarily have to be performed on all of the channels. In this case, the insertion loss of light incident on each of a plurality of incident regions is measured, and the level of insertion loss is derived on the basis of the measurement data by function interpolation. The resultant data is stored in the table memory. Moreover, although, in the method in question, the detection of output level is effected with a step-by-step rise in voltage to between $V_0$ and $V_K$ in this order, the voltage does not necessarily have to be raised in orderly sequence so long as all of the voltage values $V_0$ and $V_K$ can be obtained completely.

Further, although the above description deals with the method of constituting application levels for the pixels of the LCOS element 18A of the reflection-type optically variable filter apparatus 10A, even in a case where another wavelength selection element is used, the same effects can be attained by performing the same operation as that thus far described. Moreover, where a transmission-type wavelength selection element is concerned, by performing the same operation under the condition where each pixel is brought into a transmission state, the same effects can be attained.

The data thereby obtained on the positional relationship between the x and y axes and incident light is set in the setting part 30 shown in FIG. 3. Thus, it is possible to control insertion loss to the desired level at a predetermined wavelength with respect to a desired input. In the method in question, since the centrally-located y coordinates in input positions shown in FIG. 3 are detected, it is possible to control the pixels at the y-axis coordinates at the same level with respect to the mean of the y coordinates of the adjacent input channels, and thereby exercise desired control operation regardless of input range.

Moreover, in this embodiment, wavelengths of x coordinates are determined as the first step, the correlation between input light and y coordinates are determined as the next step, and the level of insertion loss is determined as the last step. However, in a case where the incident light is a single multi-wavelength light beam, it will suffice to determine the level of insertion loss only with the determination of wavelengths of x coordinates without the determination of the correlation between input light and y coordinates.

Further, the optically variable filter apparatus implemented by way of the present embodiment is applicable not only to an apparatus for WDM signal input but also to an apparatus for filtering of light including a plurality of wavelength components.

As particularized heretofore, according to the present invention, the relationship between each pixel of a wavelength selection element and an input channel and its wavelength, as well as the relationship between an applied voltage and insertion loss, can be determined. Therefore, by making various changes to the reflection characteristics and transmission characteristics of the wavelength selection element, it is possible to select light with a given wavelength with respect to each of multi-channel WDM signals on an individual basis. Thus, the optically variable filter array apparatus can be used as a main constituent component of a node having a WDM light Add-Drop function.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

The text of Japanese application No. 2010-279534 filed on Dec. 15, 2010 is hereby incorporated by reference.

What is claimed is:

1. A method for calibration of an optically variable filter array apparatus having a wavelength selection element including a multiplicity of pixels two-dimensionally arranged in a lattice pattern on an xy plane as a light-receiving surface, for effecting filtering by allowing incidence of at least a single wavelength-dispersion light beam which is dispersed according to wavelength on said wavelength selection element, with an x-axis direction defined as a wavelength dispersion direction, and then varying light passage characteristics by controlling a voltage to be applied to each of the pixels, the method comprising the steps of:

inputting wavelength-scanned light of single spectrum into said optically variable filter array apparatus to detect a correlation between an x coordinate of said wavelength selection element and a wavelength of incident light, and putting resultant data in storage; and inputting wavelength-scanned light of single spectrum into said optically variable filter array apparatus and varying a voltage to be applied to each of the pixels of said wavelength selection element to measure a relationship between an applied voltage and an insertion loss for each of wavelengths of light which is incident on and exits from said wavelength selection element, and putting resultant data in storage, said detection of the correlation between the x coordinate of said wavelength selection element and the wavelength of incident light comprising the steps of:
putting a plurality of pixel groups in the form of lines into a passage state in a direction perpendicular to the wavelength dispersion direction in said wavelength selection element;
scanning wavelength on a wavelength variable light source for producing output of single-spectrum light within a wavelength range including wavelengths with which the optically variable filter array apparatus can be controlled for an input of wavelength-scanned light; and
establishing of correlation in a manner such that, when an output corresponding to a line in a passage state of said wavelength selection element is produced from said optically variable filter array apparatus, on the basis of a wavelength of incident light found at the time of emission and the coordinates of a pixel in a passage state, the wavelength is correlated with the x coordinate of the wavelength selection element.

2. The method for calibration of an optically variable filter array apparatus according to claim 1, wherein, in said plurality of lines in a light passage state, part of the lines are made lower in passage rate than other lines, and wherein a correlation is established between the wavelength of incident light found at the time of emission and the x coordinate of the wavelength selection element on the basis of a level of output from a pixel in a passage state.

3. The method for calibration of an optically variable filter array apparatus according to claim 1, wherein,
determination process of a relationship between insertion loss of light and a voltage to be applied to each pixel comprises the steps of:
when voltages for said wavelength selection element are assumed to fall in a range from $V_0$ to $V_K$ (K represents a natural number of at least 2), applying a given voltage Vi among them (i falls in a 0- to K range) to each and every pixel of said wavelength selection element;
scanning wavelength on the wavelength variable light source for producing output of single-spectrum light within a wavelength range including the wavelengths with which the optically variable filter array apparatus can be controlled for an input of wavelength-scanned light to said optically variable filter array apparatus;
detecting of a level of light outputted through an incident region on said wavelength selection element upon application of the voltage $V_i$ for each of the pixels arranged in the x-axis direction on an individual basis;
executing of the same operation as described above, with the applied voltage $V_i$ varying from $V_0$ to $V_K$ within the range of setting of voltages to be applied to said wavelength selection element; and
putting of resultant data indicative of the applied voltage-insertion loss relationship as to every pixel of each incident region in storage.

4. The method for calibration of an optically variable filter array apparatus according to claim 1, wherein said optically variable filter array apparatus is a reflection-type optically variable filter array apparatus in which said wavelength selection element effects filtering by varying light reflection characteristics of each pixel.

5. The method for calibration of an optically variable filter array apparatus according to claim 1, wherein said optically variable filter array apparatus is a transmission-type optically variable filter array apparatus in which said wavelength selection element effects filtering by varying light transmission characteristics of each pixel.

6. A method for calibration of an optically variable filter array apparatus having a wavelength selection element including a multiplicity of pixels two-dimensionally arranged in a lattice pattern on an xy plane as a light-receiving surface, for effecting filtering by allowing incidence of at least a single wavelength-dispersion light beam which is dispersed according to wavelength on said wavelength selection element, with an x-axis direction defined as a wavelength dispersion direction, and then varying light passage characteristics by controlling a voltage to be applied to each of the pixels, the method comprising the steps of:
inputting wavelength-scanned light of single spectrum into said optically variable filter array apparatus to detect a correlation between an x coordinate of said wavelength selection element and a wavelength of incident light, and putting resultant data in storage;
inputting wavelength-scanned light of single spectrum into said optically variable filter array apparatus to detect a correlation between a y coordinate of said wavelength selection element and a wavelength of incident light, and putting resultant data in storage; and
inputting wavelength-scanned light of single spectrum into said optically variable filter array apparatus and varying a voltage to be applied to each of the pixels of said wavelength selection element to measure a relationship between an applied voltage and an insertion loss for each of wavelengths of light which is incident on and exits from said wavelength selection element, and putting resultant data in storage, said detection of the correlation between the x coordinate of said wavelength selection element and the wavelength of incident light comprising the steps of:
putting a plurality of pixel groups in the form of lines into a passage state in a direction perpendicular to the wavelength dispersion direction in said wavelength selection element;
scanning wavelength on a wavelength variable light source for producing output of single-spectrum light within a wavelength range including wavelengths with which the optically variable filter array apparatus can be controlled for an input of wavelength-scanned light; and
establishing of correlation in a manner such that, when an output corresponding to a line in a passage state of said wavelength selection element is produced from said optically variable filter array apparatus, on the basis of a wavelength of incident light found at the time of emission and the coordinates of a pixel in a passage state, the wavelength is correlated with the x coordinate of the wavelength selection element.

7. The method for calibration of an optically variable filter array apparatus according to claim 6, wherein, in said plurality of lines in a light passage state, part of the lines are made lower in passage rate than other lines, and wherein a correlation is established between the wavelength of incident light found at the time of emission and the x coordinate of the wavelength selection element on the basis of a level of output from a pixel in a passage state.

8. The method for calibration of an optically variable filter array apparatus according to claim 6, wherein said detection of a correlation between a y coordinate of said wavelength selection element and an incident region on which wavelength-dispersion light is incident comprises the steps of:

setting a group of pixels in the form of a line crossing diagonally said wavelength selection element defined by a predetermined function into a passage state;

scanning wavelength on the wavelength variable light source for producing output of single-spectrum light within a wavelength range including the wavelengths with which the optically variable filter array apparatus can be controlled for an input of wavelength-scanned light;

determining an x coordinate corresponding to a wavelength based on a wavelength of the wavelength-scanned light at a timing of acquisition of light which has passed through said optically variable filter array apparatus;

identifying a y coordinate on the basis of the x coordinate thereby determined by using the predetermined function; and putting the relationship between the incident light for said optically variable filter array and the y coordinate of the wavelength selection element which receives the incident light in storage.

9. The method for calibration of an optically variable filter array apparatus according to claim 6, wherein, determination of a relationship between insertion loss of light and a voltage to be applied to each pixel comprises the steps of:

when voltages for said wavelength selection element are assumed to fall in a range from $V_0$ to $V_K$ (K represents a natural number of at least 2), applying a given voltage Vi among them (i falls in a 0- to K range) to each and every pixel of said wavelength selection element;

scanning wavelength on the wavelength variable light source for producing output of single-spectrum light within a wavelength range including the wavelengths with which the optically variable filter array apparatus can be controlled for an input of wavelength-scanned light to said optically variable filter array apparatus;

detecting of a level of light outputted through an incident region on said wavelength selection element upon application of the voltage $V_i$ for each of the pixels arranged in the x-axis direction on an individual basis;

executing of the same operation as described above, with the applied voltage $V_i$ varying from $V_0$ to $V_K$ within the range of setting of voltages to be applied to said wavelength selection element; and putting of resultant data indicative of the applied voltage-insertion loss relationship as to every pixel of each incident region in storage.

10. The method for calibration of an optically variable filter array apparatus according to claim 6, wherein said optically variable filter array apparatus is a reflection-type optically variable filter array apparatus in which said wavelength selection element effects filtering by varying light reflection characteristics of each pixel.

11. The method for calibration of an optically variable filter array apparatus according to claim 6, wherein said optically variable filter array apparatus is a transmission-type optically variable filter array apparatus in which said wavelength selection element effects filtering by varying light transmission characteristics of each pixel.

* * * * *